United States Patent
Kobayashi

(10) Patent No.: US 10,082,699 B2
(45) Date of Patent: Sep. 25, 2018

(54) LIGHTING DEVICE AND DISPLAY DEVICE

(71) Applicant: Seiko Epson Corporation, Tokyo (JP)

(72) Inventor: Hidekazu Kobayashi, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 15/337,379

(22) Filed: Oct. 28, 2016

(65) Prior Publication Data

US 2017/0130934 A1 May 11, 2017

(30) Foreign Application Priority Data

Nov. 9, 2015 (JP) ................................. 2015-219214

(51) Int. Cl.
*G02F 1/133* (2006.01)
*G02F 1/1335* (2006.01)
*G02F 1/167* (2006.01)

(52) U.S. Cl.
CPC .. *G02F 1/133615* (2013.01); *G02F 1/133605* (2013.01); *G02F 1/133606* (2013.01); *G02F 1/167* (2013.01); *G02F 2001/133616* (2013.01)

(58) Field of Classification Search
CPC ......... G02F 1/133605; G02F 1/133606; G02F 1/133615; G02F 1/1335; G02F 1/1672; G02F 2001/1672; G02F 2001/133616
See application file for complete search history.

(56) References Cited

U.S. PATENT DOCUMENTS

| | | | | |
|---|---|---|---|---|
| 5,788,356 A | * | 8/1998 | Watai | ................... G02B 6/0031 362/23.15 |
| 2002/0036905 A1 | * | 3/2002 | Mabuchi | ............... G02B 6/0038 362/339 |
| 2003/0165054 A1 | | 9/2003 | Ohizumi et al. | |
| 2004/0085748 A1 | | 5/2004 | Sugiura | |
| 2005/0030728 A1 | * | 2/2005 | Kawashima | ...... G02F 1/133308 362/602 |

FOREIGN PATENT DOCUMENTS

| | | | | |
|---|---|---|---|---|
| JP | 11109876 A | * | 4/1999 | |
| JP | 2001047499 A | * | 2/2001 | |
| JP | 2003-132724 A | | 5/2003 | |
| JP | 2004-134223 A | | 4/2004 | |
| JP | 2004-139785 A | | 5/2004 | |
| JP | 2004226680 A | * | 8/2004 | |
| JP | 2004-341126 A | | 12/2004 | |
| JP | 2006-108029 A | | 4/2006 | |

* cited by examiner

*Primary Examiner* — Mariceli Santiago
(74) *Attorney, Agent, or Firm* — ALG Intellectual Property, LLC

(57) ABSTRACT

A display device includes a display member and a lighting device that illuminates a display surface of the display member. The lighting device includes a light transmissive substrate arranged opposite to the display surface of the display member and a light source that emits light source light toward between the display member and the light transmissive substrate. A correction member that corrects an incident range of light, which proceeds from the light source to the light transmissive substrate, of the light source light is provided between the light transmissive substrate and the light source. A reflection member that reflects a part of light, which proceeds from the light source to the display member, of the light source light to the light transmissive substrate is provided between the display member and the light source.

16 Claims, 17 Drawing Sheets

RESULT (f)

RESULT (f)

RESULT (g)

X, mm

RESULT (g)

RESULT (h)

RESULT (h)

LIGHTING DEVICE AND DISPLAY DEVICE

BACKGROUND

1. Technical Field

The present invention relates to a lighting device and a display device.

2. Related Art

In a display device including a reflection type display panel, transmitted light cannot be used, so that a lighting device so-called a front light is used. In such a lighting device, light source light entering from an end portion of a light guide plate travels in the light guide plate while repeating reflection between two surfaces facing each other in the thickness direction of the light guide plate and is emitted toward a display panel as illumination light (see JP-A-2006-108029 and JP-A-2003-132724).

In the lighting device of JP-A-2006-108029 and JP-A-2003-132724, it is proposed to provide a plurality of convex portions having a tapered surface on one surface of the light guide plate in order to improve uniformity of illumination. However, in such a configuration, there is a problem that reflection from the tapered surfaces enters the eyes of an observer, so that visibility of an image is degraded.

SUMMARY

An advantage of some aspects of the embodiment is to provide a lighting device and a display device which can improve uniformity of illumination in a lighting device that causes light source light to reflect on one surface of a light transmissive substrate.

A lighting device according to an aspect of the embodiment includes a light transmissive substrate, a light source provided on one surface side of the light transmissive substrate, a correction member which is provided between the light transmissive substrate and the light source and which is provided at a position blocking a part of light proceeding from the light source to the light transmissive substrate, and a first reflection member which is provided opposite to the light transmissive substrate with respect to the light source and which reflects a part of light proceeding from the light source to a side opposite to the light transmissive substrate to the light transmissive substrate.

In the lighting device according to the aspect of the embodiment, a part of light source light emitted from the light source is irradiated to a side opposite to the light transmissive substrate with respect to the light source as illumination light and the other part of light source light is reflected by one surface of the light transmissive substrate and is irradiated to the side opposite to the light transmissive substrate with respect to the light source as illumination light. Here, the correction member is provided between the light transmissive substrate and the light source and the correction member corrects an incident range of the light source light to the light transmissive substrate by blocking light, which proceeds to a portion of the light transmissive substrate close to the light source, of the light source light proceeding from the light source to the light transmissive substrate. The first reflection member is provided on the side opposite to the light transmissive substrate with respect to the light source. The first reflection member blocks light, which proceeds in a portion close to the light source, of the light source light proceeding from the light source to the side opposite to the light transmissive substrate. The light reflected by the first reflection member proceeds to a position away from the light source on the light transmissive substrate. Therefore, while the intensity of the illumination light irradiated to a position close to the light source is reduced, it is possible to increase the intensity of the illumination light irradiated to a position away from to the light source. Therefore, it is possible to improve uniformity of the illumination. Further, it is not necessary to provide a plurality of convex portions having a tapered surface in the light transmissive substrate, so that there is not a problem that the reflection from the tapered surfaces enters the eyes of an observer and thereby the visibility of an image is degraded.

A lighting device according to another aspect of the embodiment may employ a configuration in which a surface of the correction member facing the light source is a reflection surface. According to this configuration, it is possible to use light blocked by the correction member as the illumination light.

In this aspect, it is preferable that the surface of the correction member facing the light source includes a first region and a second region whose reflection ratio is lower than that of the first region. According to this configuration, it is possible to adjust the intensity distribution of light reflected by the correction member, so that it is possible to improve uniformity of the illumination.

A lighting device according to another aspect of the embodiment may employ a configuration in which the correction member is a plate-like member.

In this aspect, it is possible to employ a configuration in which the lighting device includes a second reflection member which is provided along an outer edge of the light transmissive substrate in plan view on the one surface side of the light transmissive substrate and whose inside surface is provided with a reflection surface. According to this configuration, it is possible to use light that tends to leak from an end portion of the light transmissive substrate as the illumination light by returning the light toward the light transmissive substrate again. Therefore, it is possible to increase the intensity of the illumination light. Further, it is possible to increase the amount of illumination light in a region close to the end portion of the light transmissive substrate, so that it is possible to improve the uniformity of the illumination.

A lighting device according to further another aspect of the embodiment may employ a configuration in which the correction member has a frame shape along an outer edge of the light transmissive substrate in plan view. According to this configuration, it is possible to use the correction member as a decorative frame, a parting frame, and the like.

In this aspect, it is possible to employ a configuration in which the correction member has a triangular cross-sectional shape whose bottom side faces outside of the light transmissive substrate in plan view. In the embodiment, it is possible to employ a configuration in which the correction member has a trapezoidal cross-sectional shape whose lower base faces outside of the light transmissive substrate in plan view.

In the above aspect, it is possible to employ a configuration in which a surface of the correction member facing the light source is a surface obliquely inclined with respect to the light transmissive substrate.

In this aspect, it is possible to employ a configuration in which the surface of the correction member facing the light source is a surface in parallel with the light transmissive substrate. According to this configuration, it is possible to use light reflected by the correction member as illumination light by orienting the light toward a position away from the light source, so that it is possible to increase the intensity of the illumination light.

In a lighting device according to further another aspect of the embodiment, it is preferable that a reflective film whose reflection ratio varies according to an incident angle is provided on the one surface of the light transmissive substrate or the other surface which is opposite to the one surface. According to this configuration, it is possible to increase the intensity of the illumination light that is reflected by the light transmissive substrate and emitted.

A display device according to an aspect of the embodiment includes a lighting device according to an aspect of the embodiment. Specifically, the display device according to an aspect of the embodiment includes a display member, a light transmissive substrate arranged to face one surface of the display member, a light source provided between the display member and the light transmissive substrate, a correction member which is provided between the light transmissive substrate and the light source and which is provided at a position blocking a part of light proceeding from the light source to the light transmissive substrate, and a first reflection member which is provided between the display member and the light source and which reflects a part of light proceeding from the light source to a side opposite to the light transmissive substrate to the light transmissive substrate.

A display device according to another aspect of the embodiment may employ a configuration in which a surface of the correction member facing the light source is a reflection surface.

A display device according to another aspect of the embodiment may employ a configuration in which the display member is an electro-optical device.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
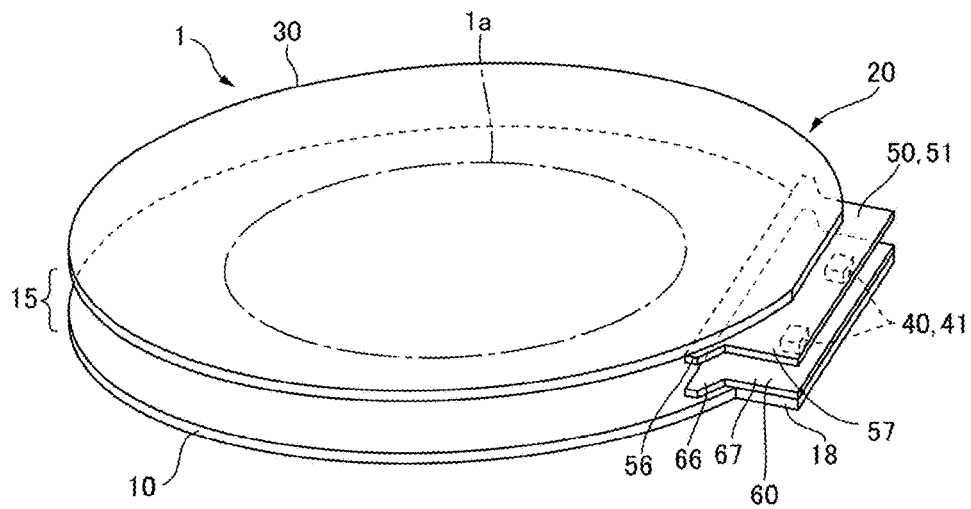
FIG. 1 is a perspective view showing an aspect of a lighting device and a display device according to a first embodiment.

Embodiments will be described with reference to the drawings. In the drawings referred to in the description below, the scales of layers and members are different from each other so that the layers and the members have sizes that can be recognized on the drawings.

First Embodiment

Entire Configuration

Figure 2:
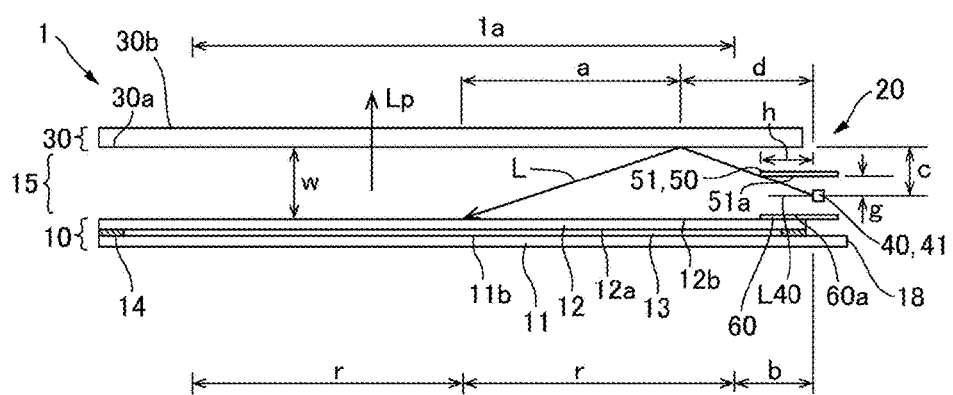
FIG. 2 is a cross-sectional view of the lighting device and the display device shown in FIG. 1.

FIG. 1 is a perspective view showing an aspect of a lighting device and a display device according to a first embodiment. FIG. 2 is a cross-sectional view of the lighting device and the display device shown in FIG. 1.

As shown in FIGS. 1 and 2, a lighting device 20 of the present embodiment includes a light transmissive substrate 30 formed of glass, quartz, resin, or the like and a light source 40 whose optical axis L40 is in a direction along one surface 30a of the light transmissive substrate 30. Therefore, a part of light source light L emitted from the light source 40 is irradiated to a side opposite to the light transmissive substrate 30 with respect to the light source 40 as illumination light and the other part of light source light L is reflected by one surface 30a of the light transmissive substrate 30 and is irradiated to the side opposite to the light transmissive substrate 30 with respect to the light source 40 as illumination light. In the present embodiment, the light transmissive substrate 30 has a circular shape and the light source 40 is arranged at a predetermined position in a circumferential direction of the light transmissive substrate 30. In the present embodiment, two light emitting elements 41 are used as the light source 40. In the present embodiment, the light emitting element 41 is formed of a light emitting diode.

For example, the lighting device 20 is used to illuminate a display member 10 in the display device 1. The display device 1 includes the display member 10 and the lighting device 20 that illuminates one surface (a display surface 12b) of the display member 10. The lighting device 20 includes the light transmissive substrate 30 arranged opposite to the display surface 12b of the display member 10 with a gap 15 in between and the light source 40 that emits the light source light L toward between the display member 10 and the light transmissive substrate 30. The light transmissive substrate 30 has a function as a cover glass. Therefore, the illumination light emitted from the lighting device 20 is reflected by the display member 10 and thereafter passes through the light transmissive substrate 30 and is emitted from the other surface 30b of the light transmissive substrate 30 as image light Lp.

The display member 10 is a reflection type display panel such as an electrophoretic panel and a reflection type liquid crystal panel. The display member 10 includes a first substrate 11, a light transmissive second substrate 12 arranged opposite to the first substrate 11, a display layer 13 provided between the first substrate 11 and the second substrate 12, and a sealing layer 14 that seals the circumference of the display layer 13 between the first substrate 11 and the second substrate 12. An electrode (not shown in the drawings) that drives the display layer 13 is formed on a surface 11b of the first substrate 11 facing the second substrate 12 and a surface 12a of the second substrate 12 facing the first substrate 11.

In the display member 10, while the illumination light entering through the second substrate 12 is reflected by the display layer 13 and the first substrate 11 and emitted through the second substrate 12, the illumination light is optically modulated by the display layer 13 and an image is displayed. In the present embodiment, the display member 10 is an electrophoretic panel or a reflection type liquid crystal panel. Therefore, the display member 10 can display an image by turning off the light source 40 and using natural light in a bright environment and can display an image by turning on the light source 40 and using the light source light L emitted from the light source 40 in a dark environment.

The display member 10 has a circular shape in the same manner as the light transmissive substrate 30 and is provided with a connection region 18, to which a flexible wiring substrate (not shown in the drawings) is connected, in a predetermined position in a circumferential direction. The connection region 18 is provided as a rectangular region in a position overlapped with the light source 40 in plan view. The display member 10 has a circular display region 1a, where an image is displayed, in a central portion of a region surrounded by the sealing layer 14.

Configuration of Correction Member and First Reflection Member

The lighting device 20 and the display device 1 of the present embodiment have a correction member 50 between the light transmissive substrate 30 and the light source 40. The correction member 50 corrects an incident range of the light source light L to the light transmissive substrate 30 by blocking a part of light proceeding from the light source 40 to the light transmissive substrate 30. In the present embodiment, the correction member 50 is a plate member 51 and a surface 51a of the correction member 50 facing the light source 40 has light absorbing characteristics. In the present embodiment, a light absorbing treatment is applied to the surface 51a of the correction member 50 facing the light source 40. For example, a light absorbing layer (not shown in the drawings) is provided on the surface 51a of the correction member 50 facing the light source 40.

The lighting device 20 has a reflection member 60 (a first reflection member) between the light source 40 and the display member 10 on the opposite side of the light transmissive substrate 30 with respect to the light source 40. The reflection member 60 reflects a part of light, which proceeds from the light source 40 to the opposite side of the light transmissive substrate 30, of the light source light L to the light transmissive substrate 30. In the present embodiment, the reflection member 60 is a plate-like member and a surface 60a of the reflection member 60 facing the light source 40 has light reflecting characteristics. In the present embodiment, the surface 60a of the reflection member 60 facing the light source 40 is formed as a total reflection surface. For example, a reflective metal layer (not shown in the drawings) is provided on the surface of the reflection member 60 facing the light source 40.

The correction member 50 and the reflection member 60 are overlapped with the light source 40, the light transmissive substrate 30, and the display member 10 in plan view. However, the correction member 50 and the reflection member 60 are not overlapped with the display region 1a in plan view. The correction member 50 includes a first portion 56 overlapping with a portion of the light transmissive substrate 30 facing the light source 40 in plan view and a second portion 57 which overlaps with the connection region 18 of the display member 10 in plan view but does not overlap with the light transmissive substrate 30 in plan view. The reflection member 60 includes a first portion 66 overlapping with a portion of the light transmissive substrate 30 facing the light source 40 in plan view and a second portion 67 which overlaps with the connection region 18 of the display member 10 in plan view but does not overlap with the light transmissive substrate 30 in plan view.

Specific Configuration Example

Figure 3:
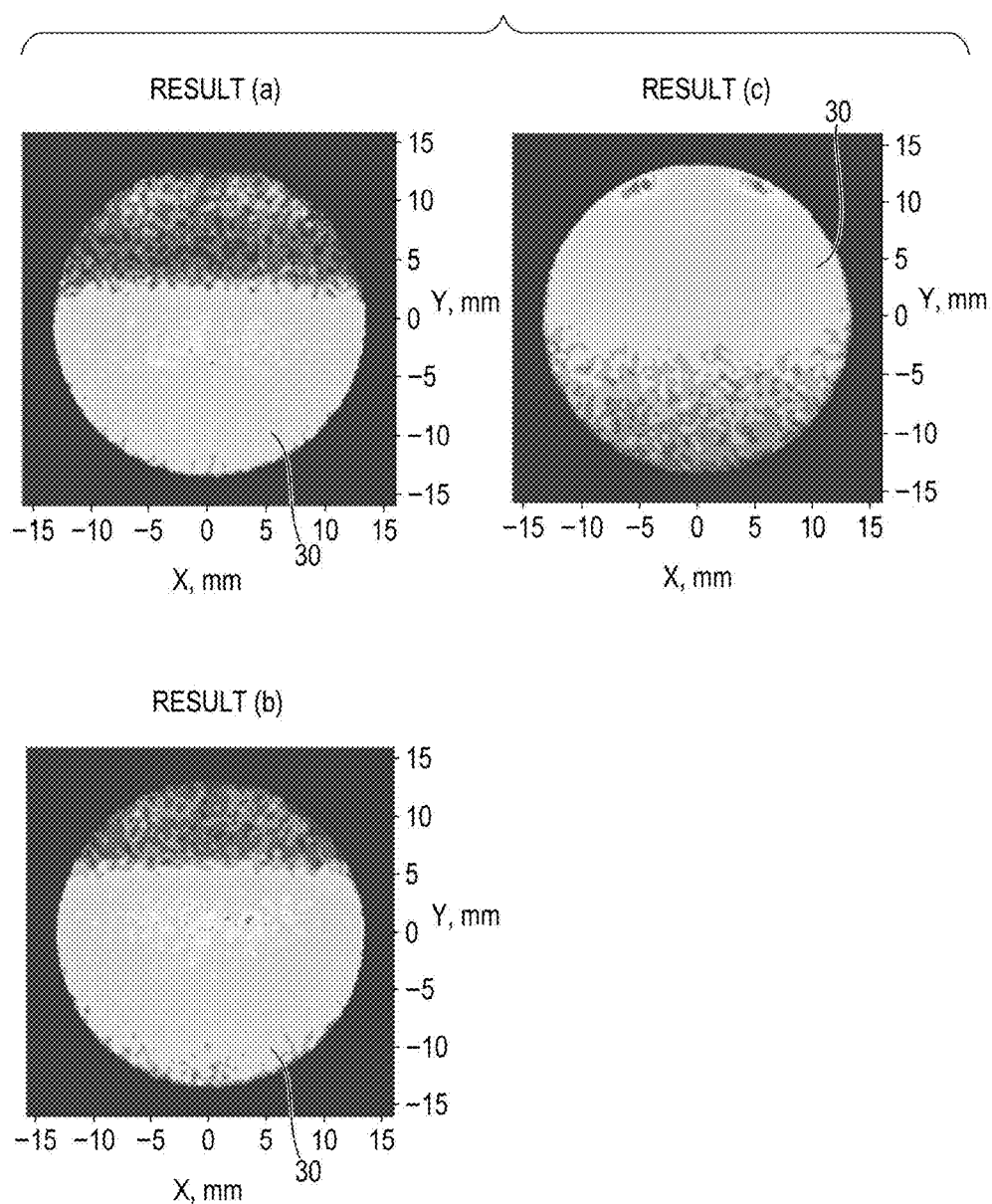
FIG. 3 is an explanatory diagram showing light beam analysis results of the lighting device and the like according to the first embodiment.
Figure 4:
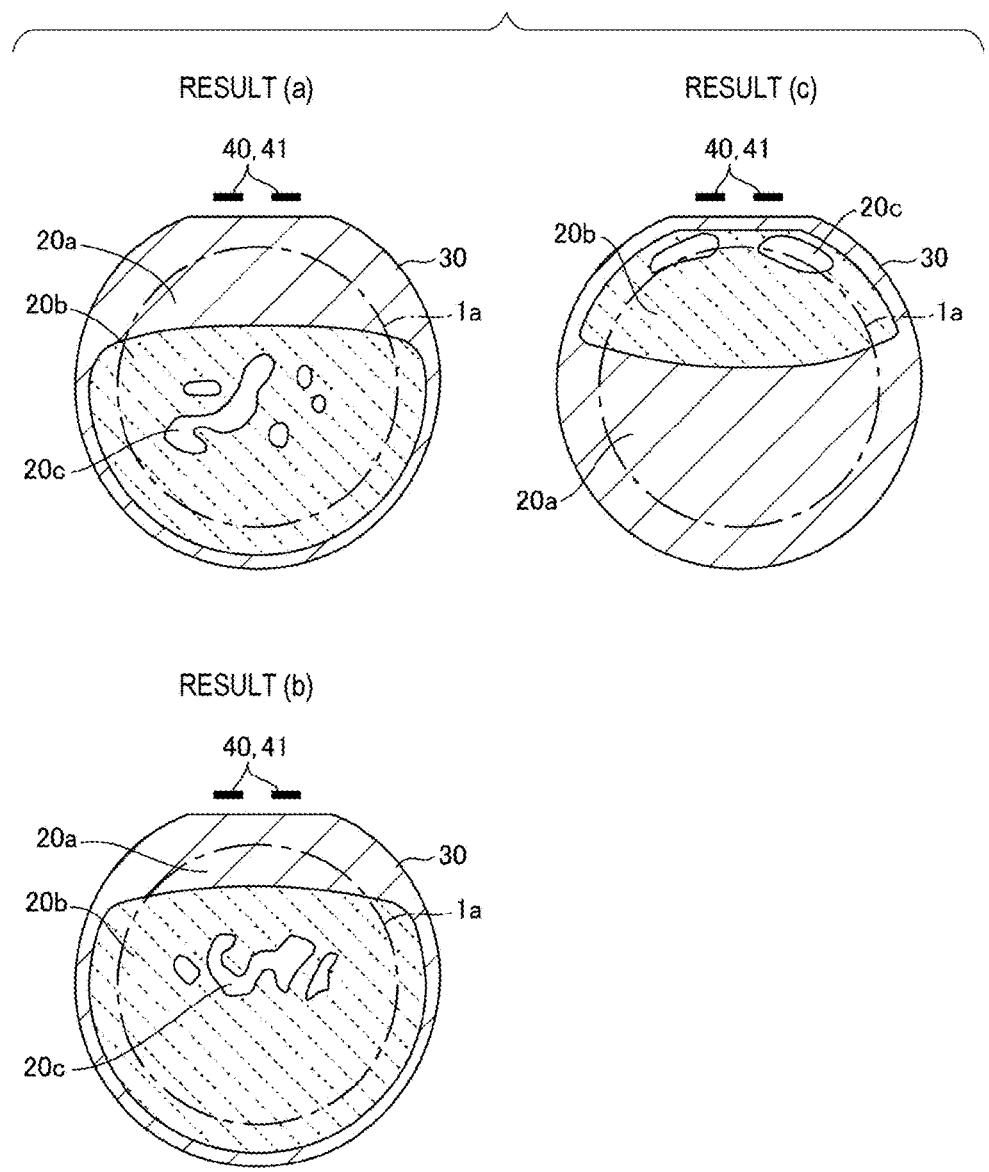
FIG. 4 is an explanatory diagram schematically showing characteristics of the light beam analysis results shown in FIG. 3.

FIG. 3 is an explanatory diagram showing light beam analysis results with light beam tracking technique of the lighting device 20 and the like according to the first embodiment. FIG. 4 is an explanatory diagram schematically showing characteristics of the light beam analysis results shown in FIG. 3. In FIG. 4, right-upward oblique lines are drawn in a region 20a where the intensity of the illumination light is relatively low, right-downward dotted lines are drawn in a region 20b where the intensity of the illumination light is relatively high, and oblique lines or the like are not drawn in a region 20c where the intensity of the illumination light is the highest.

In the lighting device 20 and the display device 1 of the present embodiment, for example, the dimensions of each region are set as described below. First, the width of the display region 1a of the display member 10 is defined as 2×r, the distance from the light source 40 to the display region 1a is defined as b, the gap between the display surface 12b of the display member 10 and the light transmissive substrate 30 is defined as w, the gap between the light source 40 and the light transmissive substrate 30 is defined as c, the distance from a position closest to the light source 40 at which the light emitted from the light source 40 is directly reflected by the light transmissive substrate 30 to the light source 40 is defined as d, and the distance from the position closest to the light source 40 at which the light emitted from the light source 40 is directly reflected by the light transmissive substrate 30 to the center of the display region 1a is defined as a.

In the present embodiment, the dimensions described above satisfy the following equation.

$$d=c\times(r+b)/(c+w)$$

Therefore, a region where the light reflected by the light transmissive substrate 30 illuminates on the side of the light source 40 is the center of the display region 1a.

When an extension length of the correction member 50 from the light source 40 is defined as h and the gap between the correction member 50 and the light source 40 is defined as g, the above dimensions satisfy the following equation.

$$g/h=(c+w)/(r+b)$$

Therefore, it is possible to illuminate a region farther than the center of the display region 1a with respect to the light source 40. In this case, when also illuminating the center of the display region 1a, a configuration in which the extension length h is shortened, a configuration in which the gap g between the correction member 50 and the light source 40 is elongated, or a configuration in which the gap w between the display surface 12b of the display member 10 and the light transmissive substrate 30 is shortened is employed.

For example, the dimensions described below are employed.

r=15 mm
b=2.7 mm
c=2.3 mm
w=2.6 mm
h=5.8 mm
g=1.6 mm

A light beam analysis result obtained by analysis a light beam which is emitted from the light source 40 and then emitted as illumination light in the above configuration by simulation is shown as a result (a) in FIGS. 3 and 4. Further, a light beam analysis result in a case in which h is shortened to 4.8 mm in the above configuration is shown as a result (b) in FIGS. 3 and 4. Further, a light beam analysis result of a reference example in which the above configuration is used as a base, but the correction member 50 and the reflection member 60 are not provided is shown as a result (c) in FIGS. 3 and 4.

As known from the results (a) and (b) shown in FIGS. 3 and 4, according to the present embodiment, it is possible to arrange the brightest regions 20c to positions close to the center of the display region 1a. On the other hand, in the reference example in which the correction member 50 and the reflection member 60 are not provided, as known from the result (c) shown in FIGS. 3 and 4, the brightest regions 20c are arranged at only positions close to the light source 40 and it is not possible to arrange the bright regions 20b and 20c to positions close to the center of the display region 1a.

In the lighting device 20 and the display device 1 of the present embodiment, when the gap w between the display surface 12b of the display member 10 and the light transmissive substrate 30 is shortened to 2.3 mm, the same effect as that shown in FIGS. 3 and 4 can also be obtained and the utilization efficiency of light is 0.36% at that time.

When a semi-reflective light transmissive film where the transmittance ratio is high in the normal direction of the surface and the reflection ratio is high in an oblique direction is formed on the one surface 30a of the light transmissive substrate 30, it is possible to alleviate light that directly enters eyes from the light source 40 when seeing the display surface 12b from an oblique direction.

Main Effects of the Present Embodiment

As described above, in the lighting device 20 and the display device 1 of the present embodiment, a part of the light source light L emitted from the light source 40 is irradiated to the display region 1a of the display member 10 provided opposite to the light transmissive substrate 30 with respect to the light source 40 as the illumination light and the other part of the light source light L is reflected by one surface 30a of the light transmissive substrate 30 and is irradiated to the display region 1a of the display member 10 provided opposite to the light transmissive substrate 30 with respect to the light source 40 as the illumination light. Here, the correction member 50 is provided between the light transmissive substrate 30 and the light source 40 and the correction member 50 corrects the incident range of the light source light L to the light transmissive substrate 30 by blocking light, which proceeds to a portion of the light transmissive substrate 30 close to the light source 40, of the light source light L proceeding from the light source 40 to the light transmissive substrate 30. The reflection member 60 (the first reflection member) is provided on the side opposite to the light transmissive substrate 30 with respect to the light source 40 (between the light source 40 and the display member 10) and the reflection member 60 blocks light, which proceeds in a portion close to the light source 40, of the light source light proceeding from the light source 40 to the display member 10 provided opposite to the light transmissive substrate 30. The light reflected by the reflection member 60 proceeds to a position away from the light source 40 on the light transmissive substrate 30. Therefore, while the intensity of the illumination light irradiated to a position close to the light source 40 is reduced, the intensity of the illumination light irradiated to a position away from to the light source 40 is increased. Therefore, it is possible to improve uniformity of the illumination. Further, it is not necessary to provide a plurality of convex portions having a tapered surface in the light transmissive substrate 30, so that the cost is low and there is not a problem that the reflection from the tapered surfaces enters the eyes of an observer and thereby the visibility of an image is degraded.

Modified Example 1 Of First Embodiment

Figure 5:
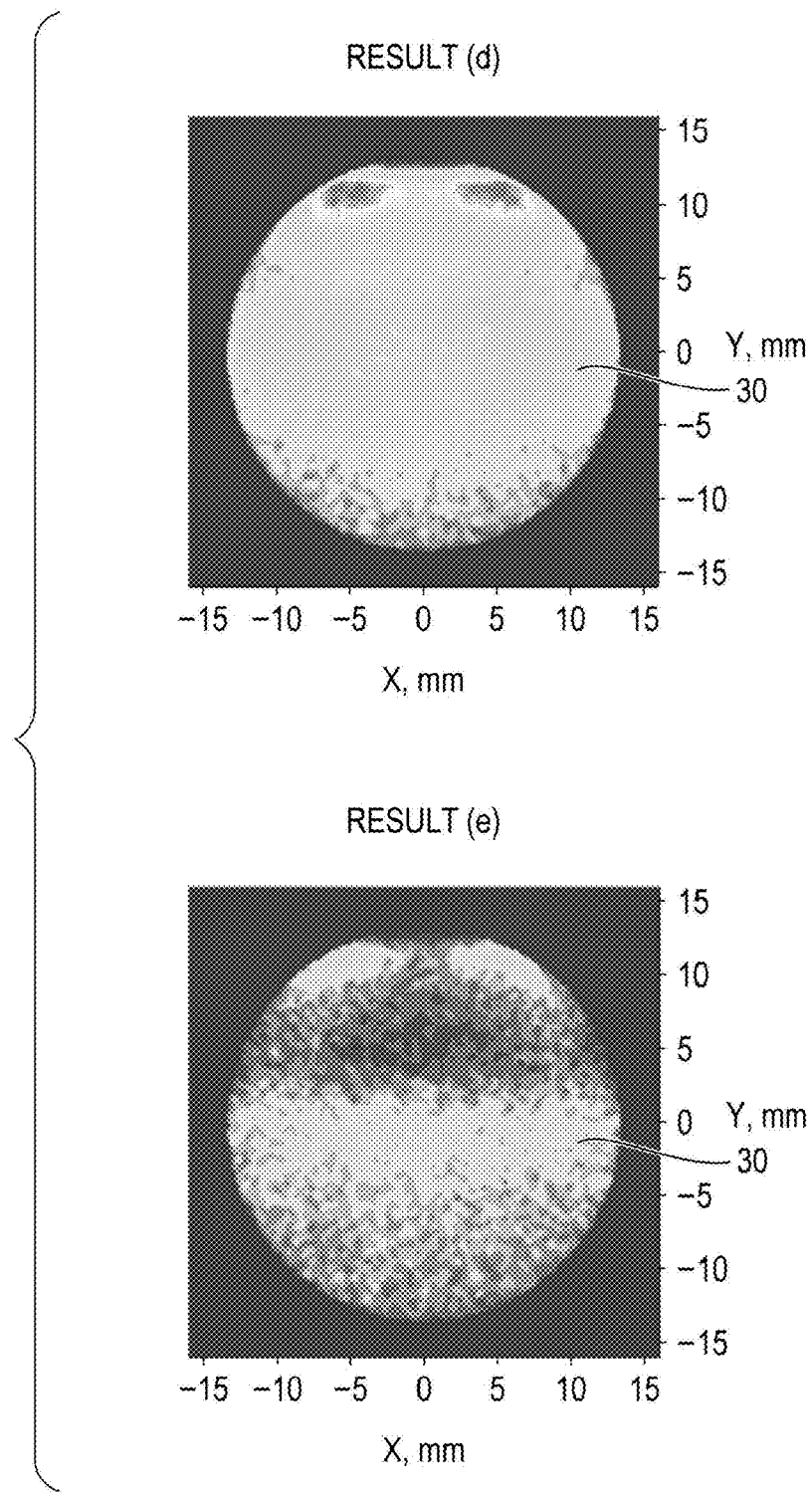
FIG. 5 is an explanatory diagram showing light beam analysis results of a lighting device and the like according to a modified example 1 of the first embodiment.
Figure 6:
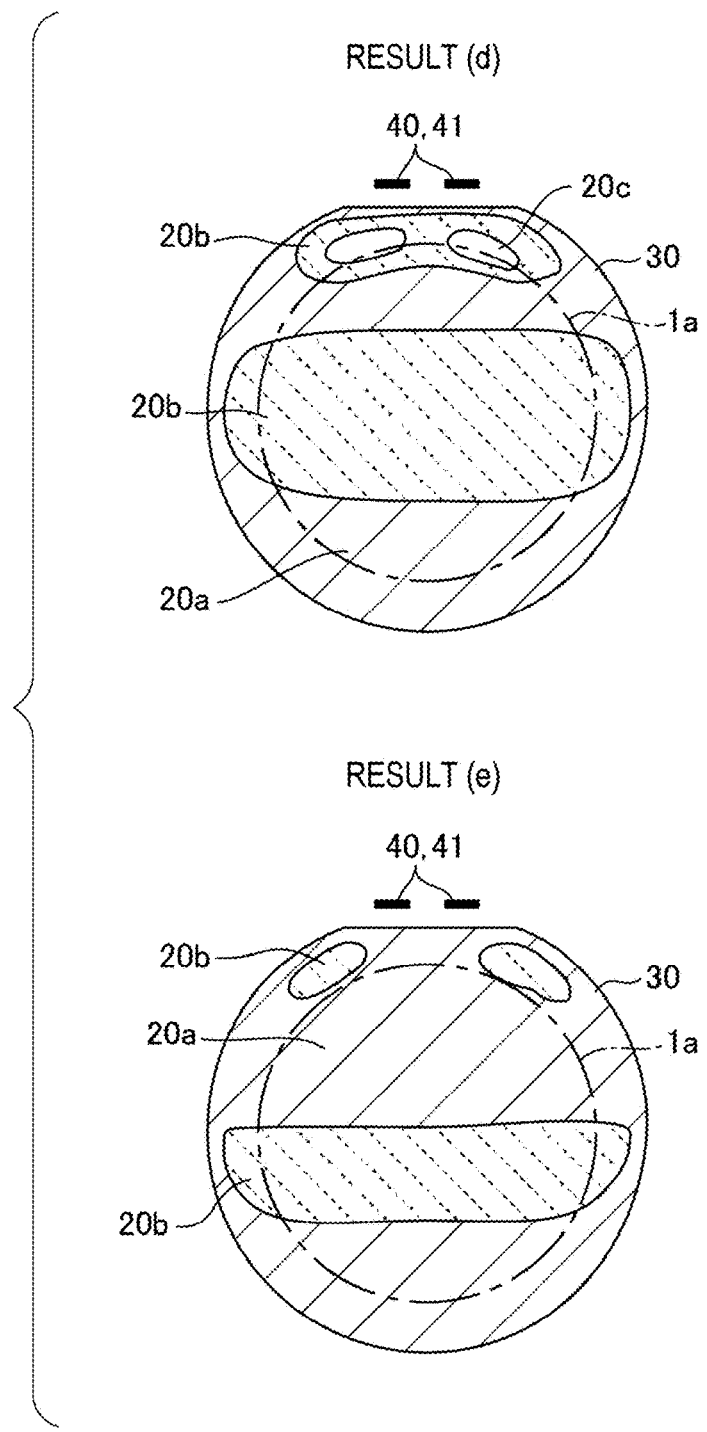
FIG. 6 is an explanatory diagram schematically showing characteristics of the light beam analysis results shown in FIG. 5.

FIG. 5 is an explanatory diagram showing light beam analysis results of a lighting device 20 and the like according to a modified example 1 of the first embodiment. FIG. 6 is an explanatory diagram schematically showing characteristics of the light beam analysis results shown in FIG. 5. In FIG. 6, right-upward oblique lines are drawn in a region 20a where the intensity of the illumination light is relatively low, right-downward dotted lines are drawn in a region 20b where the intensity of the illumination light is relatively high, and oblique lines or the like are not drawn in a region 20c where the intensity of the illumination light is the highest.

A basic configuration of the lighting device 20 and the display device 1 of the present embodiment is the same as that of the first embodiment described with reference to FIGS. 1 to 4, and therefore the drawings and the detailed description thereof will be omitted. In the lighting device 20 and the display device 1 according to the first embodiment, the surface 51a of the correction member 50 facing the light source 40 has light absorbing characteristics. However, in the present embodiment, the surface 51a of the correction member 50 (the plate member 51) facing the light source 40 has light reflecting characteristics. For example, black alumite treatment is performed on the surface 51a of the correction member 50 facing the light source 40, so that light reflecting characteristics are given to the surface 51a. For the correction member 50, it is possible to employ a configuration in which a portion that blocks light and a portion that gives light reflecting characteristics to the surface 51a of the correction member 50 facing the light source 40 are formed into to an integrated member, and further it is possible to combine the portion that blocks light and the portion that gives light reflecting characteristics to the surface 51a of the correction member 50 facing the light source 40 to form the correction member 50.

In the same manner as in the first embodiment, the surface 60a of the reflection member 60 facing the light source 40 has light reflecting characteristics.

A light beam analysis result in the lighting device 20 having the configuration described above is shown as a result (d) in FIGS. 5 and 6. Further, a light beam analysis result of a reference example in which the above configuration is used as a base, but the reflection member 60 is not provided is shown as a result (e) in FIG. 6.

As known from the result (d) shown in FIGS. 5 and 6, according to the present embodiment, the correction member 50 can block the light, which proceeds to a portion of the light transmissive substrate 30 close to the light source 40, of the light source light L proceeding from the light source 40 to the light transmissive substrate 30, and further can reflect the light to the display member 10 provided opposite to the light transmissive substrate 30 with respect to the light source 40. Therefore, it is possible to arrange the brightest region 20c to a position close to the center of the display region 1a and it is possible to appropriately increase the intensity of the illumination light at a position close to the light source 40. The utilization efficiency of light is 0.5%. On the other hand, in the reference example in which the reflection member 60 is not provided, as known from the result (e) shown in FIGS. 5 and 6, the intensity of the illumination light is generally low and the utilization efficiency of light is 0.24%.

Modified Example 2 Of First Embodiment

Figure 7:
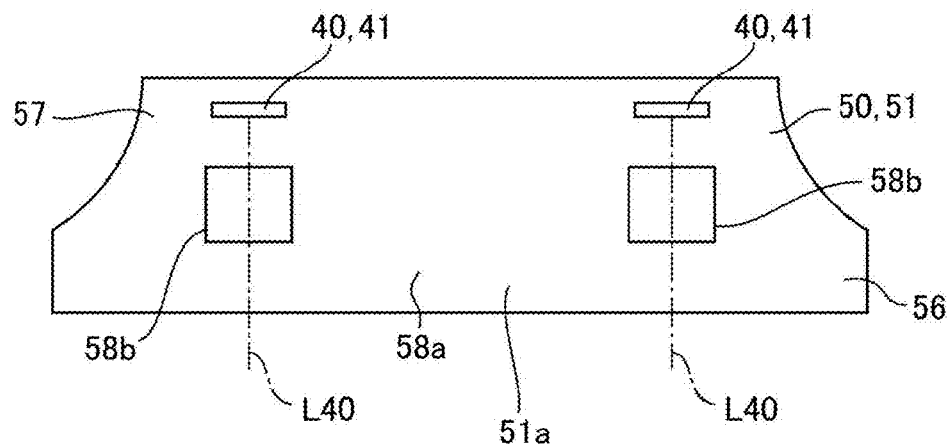
FIG. 7 is an explanatory diagram of a correction member used for a lighting device according to a modified example 2 of the first embodiment.
Figure 8:
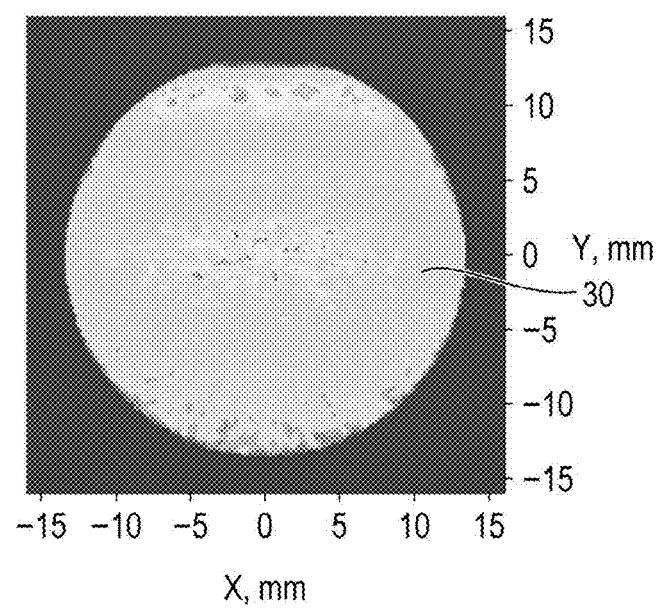
FIG. 8 is an explanatory diagram showing a light beam analysis result of a case in which the correction member shown in FIG. 7 is used.
Figure 9:
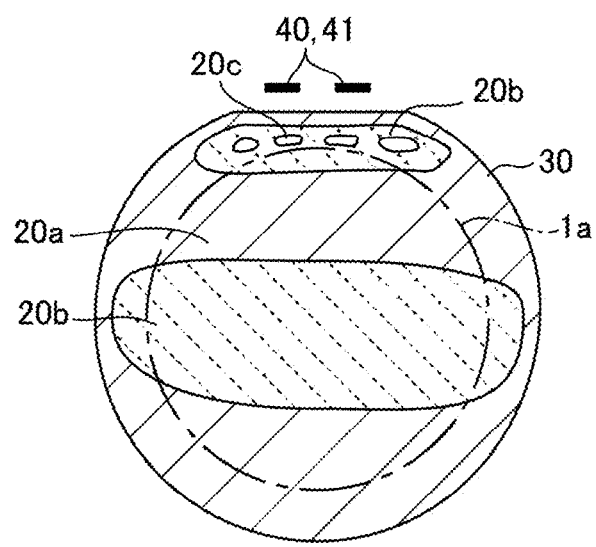
FIG. 9 is an explanatory diagram schematically showing characteristics of the light beam analysis result shown in FIG. 8.

FIG. 7 is an explanatory diagram of a correction member 50 used for a lighting device 20 according to a modified example 2 of the first embodiment. FIG. 8 is an explanatory diagram showing a light beam analysis result of a case in which the correction member 50 shown in FIG. 7 is used. FIG. 9 is an explanatory diagram schematically showing characteristics of the light beam analysis result shown in FIG. 8. In FIG. 9, right-upward oblique lines are drawn in a region 20a where the intensity of the illumination light is relatively low, right-downward dotted lines are drawn in a region 20b where the intensity of the illumination light is relatively high, and oblique lines or the like are not drawn in a region 20c where the intensity of the illumination light is the highest.

A basic configuration of the lighting device 20 and the display device 1 of the present embodiment is the same as those of the first embodiment and the modified example 1 of the first embodiment, which are described with reference to FIGS. 1 to 6, and therefore the drawings and the detailed description thereof will be omitted. In the lighting device 20 and the display device 1 according to the modified example 1 of the first embodiment, the entire surface of the surface 51a of the correction member 50 facing the light source 40 is a uniform reflection surface. However, in the present embodiment, as shown in FIG. 7, the surface 51a (reflection surface) of the correction member 50 facing the light source 40 includes a first region 58a and second regions 58b whose reflection ratio is lower than that of the first region 58a. In the present embodiment, while the first region 58a is a reflective region, the second region 58b is a light absorption region, so that it can be said that the reflectivity of the second region 58b is lower than that of the first region 58a. Such a configuration can be realized by, for example, forming the second region 58b by attaching a light absorptive sheet or the like to the surface 51a (reflection surface) of the correction member 50 facing the light source 40.

In the present embodiment, in the correction member 50, the second region 58b is provided in a region overlapping with the optical axis L40 of the light source 40 in plan view between the light source 40 and the display region 1a. For example, In the present embodiment, there are two light sources 40, so that in the correction member 50, a quadrangular second region 58b is provided to each of two regions respectively overlapping with the optical axes L40 of the two light sources 40 in plan view.

A light beam analysis result in the lighting device 20 having the configuration described above is shown as a result (f) in FIGS. 8 and 9. As known from the result (f) shown in FIGS. 8 and 9, according to the present embodiment, regions whose reflection ratios are different from each other are appropriately provided on the surface 51a (reflection surface) of the correction member 50 facing the light source 40, so that it is possible to improve uniformity of intensity of illumination light at a position close to the light source 40. The utilization efficiency of light is 0.48%.

The shape of the second region 58b may be a circle, an ellipse, or another shape in addition to a quadrangle. The second region 58b is not limited to the light absorption region, but may be a reflective region whose reflectivity is lower than that of the first region 58a.

Second Embodiment

Figure 10:
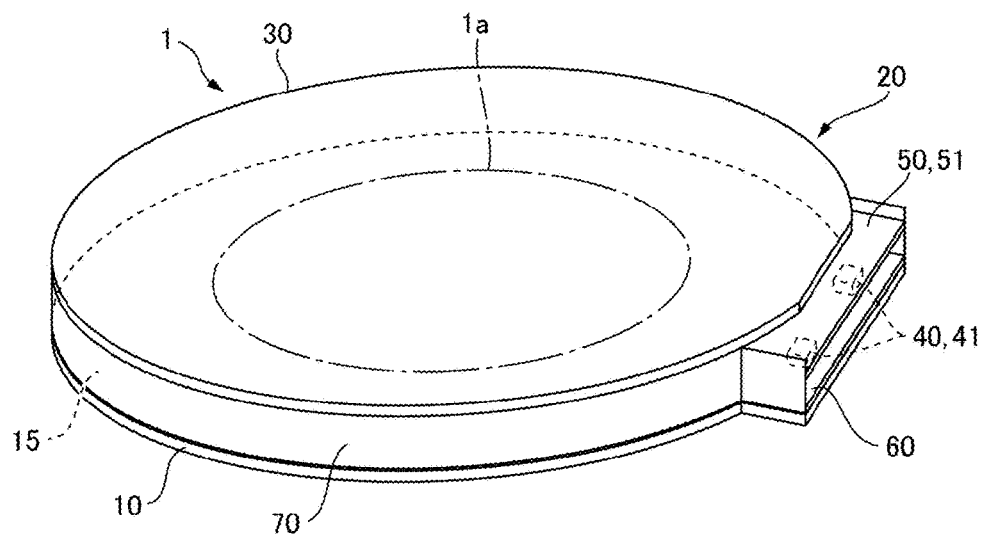
FIG. 10 is a perspective view showing an aspect of a lighting device and a display device according to a second embodiment.
Figure 11:
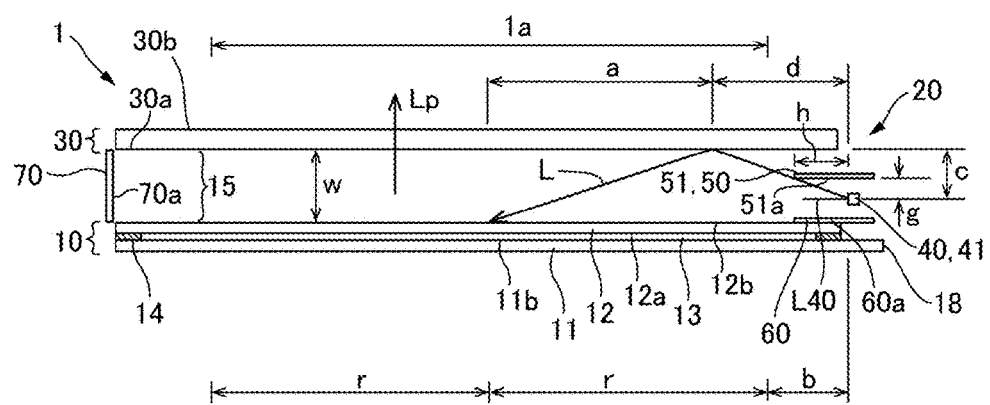
FIG. 11 is a cross-sectional view of the lighting device and the display device shown in FIG. 10.
Figure 12:
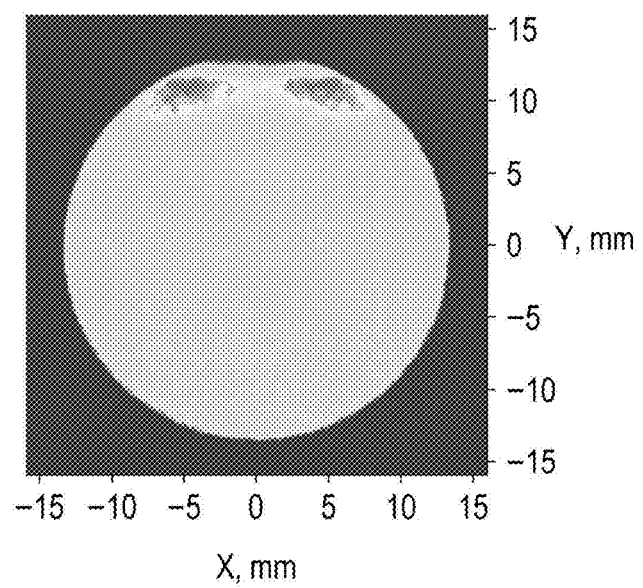
FIG. 12 is an explanatory diagram showing a light beam analysis result in the lighting device shown in FIG. 10.
Figure 13:
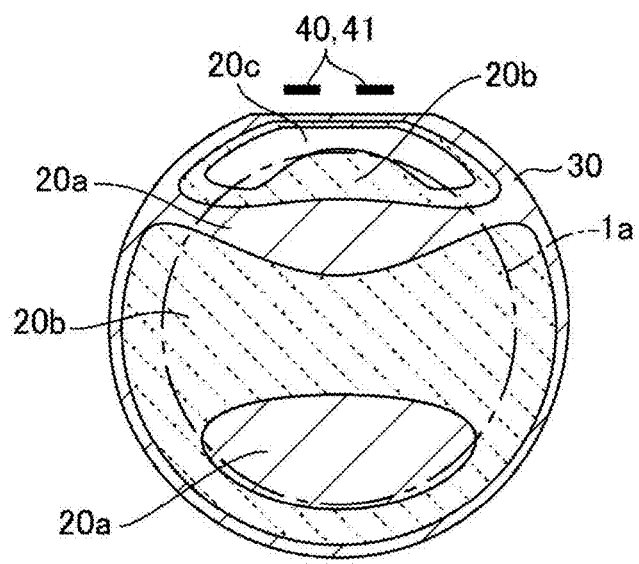
FIG. 13 is an explanatory diagram schematically showing characteristics of the light beam analysis result shown in FIG. 12.

FIG. 10 is a perspective view showing an aspect of a lighting device and a display device according to a second embodiment. FIG. 11 is a cross-sectional view of the lighting device and the display device shown in FIG. 10. FIG. 12 is an explanatory diagram showing a light beam analysis result in the lighting device 20 shown in FIG. 10. FIG. 13 is an explanatory diagram schematically showing characteristics of the light beam analysis result shown in FIG. 12. In FIG. 13, right-upward oblique lines are drawn in a region 20a where the intensity of the illumination light is relatively low, right-downward dotted lines are drawn in a region 20b where the intensity of the illumination light is relatively high, and oblique lines or the like are not drawn in a region 20c where the intensity of the illumination light is the highest.

A basic configuration of the lighting device 20 and the display device 1 of the present embodiment is the same as those of the first embodiment and the modified examples 1 and 2 of the first embodiment, which are described with reference to FIGS. 1 to 9, and therefore the same reference numerals are given to the same components and the description thereof will be omitted. As shown in FIGS. 10 and 11, the lighting device 20 of the present embodiment includes a reflection member 70 (a second reflection member), which is provided along an outer edge of the light transmissive substrate 30 and whose reflection surface 70a faces inside where the one surface 30a of the light transmissive substrate 30 is located, on the side of the one surface 30a of the light transmissive substrate 30. In other words, the display member 1 includes the reflection member 70 (the second reflection member) that surrounds the gap 15 between the light transmissive substrate 30 and the display member 10 from outside, and the inner surface of the reflection member 70 facing the gap 15 is the reflection surface 70a.

In the present embodiment, the reflection surface 70a of the reflection member 70 is a diffusion reflection surface that reflects incident light as scattering light. In the present embodiment, the reflection surface 70a of the reflection member 70 has Lambertian reflection characteristics and reflects incident light isotropically. Such a configuration can be realized by, for example, a configuration in which a light scattering film or the like that is used as a backlight member of a liquid crystal display device is used as the reflection member 70 and a configuration in which a light scattering film is attached to the inner surface of the reflection member 70 to form the reflection surface 70a.

In the present embodiment, the reflection member 70 is provided based on the modified example 1 of the first embodiment, and the surface 51a of the correction member 50 (the plate member 51) facing the light source 40 and the surface 60a of the reflection member 60 facing the light source 40 have light reflecting characteristics.

A light beam analysis result in the lighting device 20 having the configuration described above is shown as a result (g) in FIGS. 12 and 13. As known from the result (g) shown in FIGS. 12 and 13, according to the present embodiment, the light that tends to leak to the outside of the light transmissive substrate 30 is returned to the side of the light transmissive substrate 30 by the reflection surface (the surface 70a) of the reflection member 70, so that the uniformity and efficiency of illumination are improved and the utilization efficiency of light is 0.8%.

In the present embodiment, the reflection member 70 is provided to the lighting device 20 and the display device 1 according to the modified example 1 of the first embodiment. However, the reflection member 70 may be provided to the lighting device 20 and the display device 1 according to the modified example 2 of the first embodiment.

Third Embodiment

Figure 14:
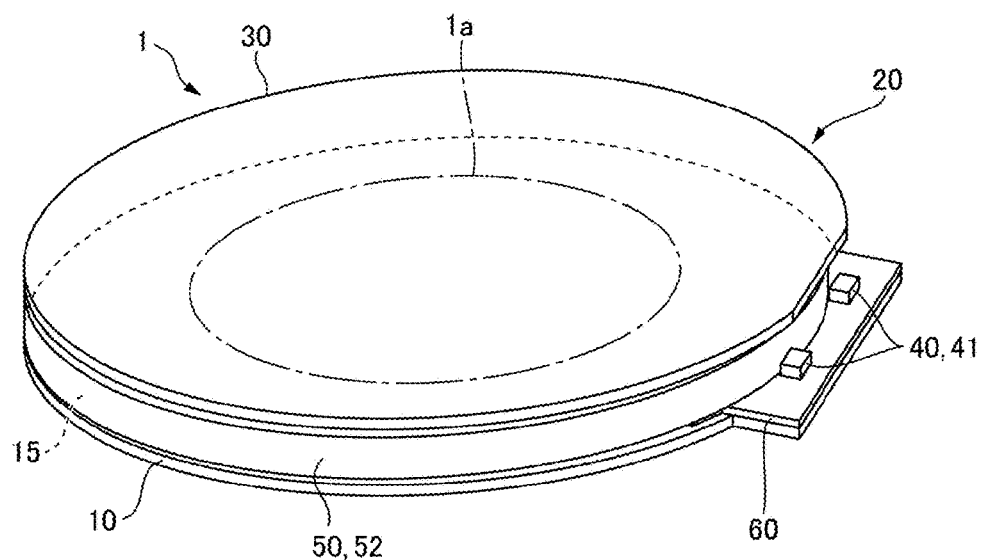
FIG. 14 is a perspective view showing an aspect of a lighting device and a display device according to a third embodiment.
Figure 15:
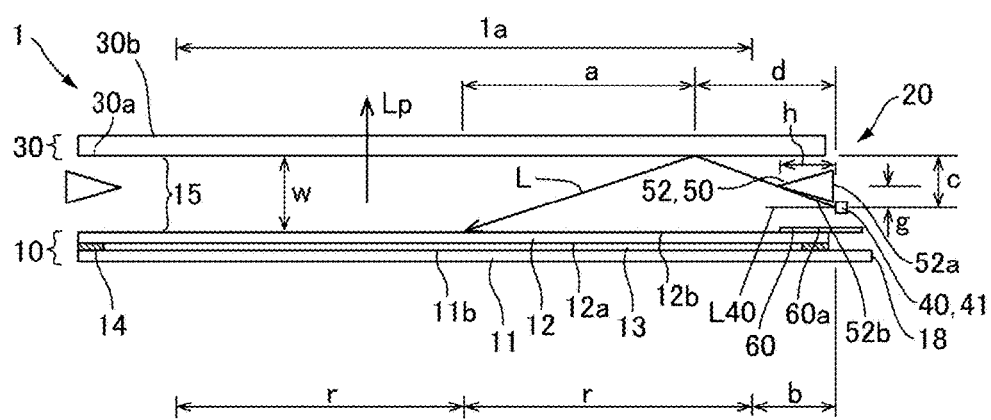
FIG. 15 is a cross-sectional view of the lighting device and the display device shown in FIG. 14.
Figure 16:
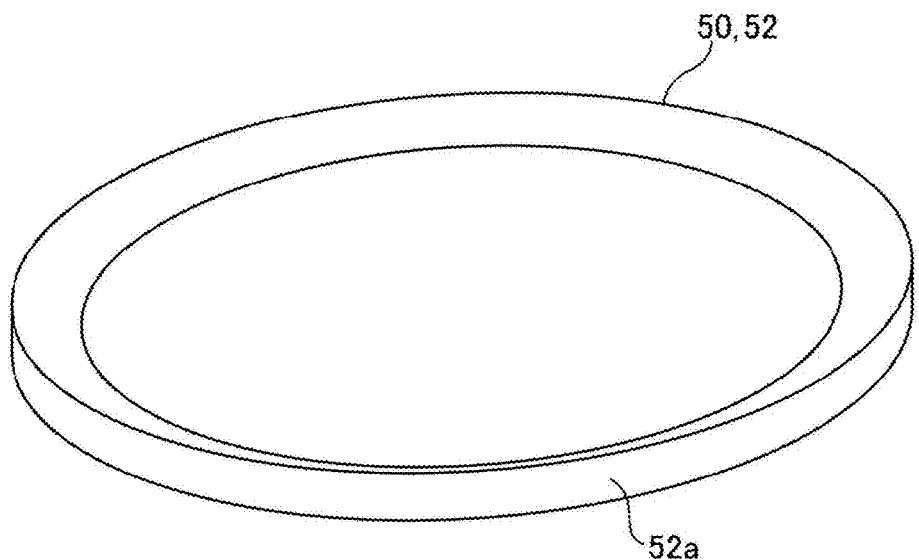
FIG. 16 is a perspective view of a correction member used in the lighting device and the display device shown in FIG. 14.
Figure 17:
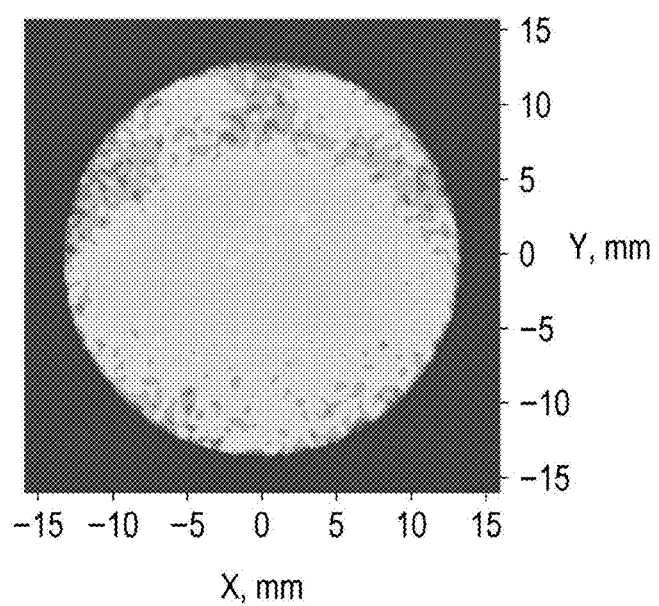
FIG. 17 is an explanatory diagram showing a light beam analysis result in the lighting device shown in FIG. 14.
Figure 18:
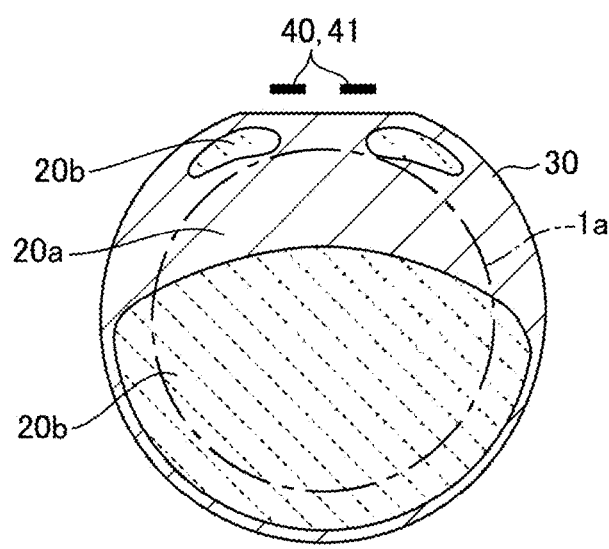
FIG. 18 is an explanatory diagram schematically showing characteristics of the light beam analysis result shown in FIG. 17.

FIG. 14 is a perspective view showing an aspect of a lighting device and a display device according to a third embodiment. FIG. 15 is a cross-sectional view of the lighting device and the display device shown in FIG. 14. FIG. 16 is a perspective view of a correction member used in the lighting device and the display device shown in FIG. 14. FIG. 17 is an explanatory diagram showing a light beam analysis result in the lighting device 20 shown in FIG. 14. FIG. 18 is an explanatory diagram schematically showing characteristics of the light beam analysis result shown in FIG. 17. In FIG. 18, right-upward oblique lines are drawn in a region 20a where the intensity of the illumination light is relatively low, and right-downward dotted lines are drawn in a region 20b where the intensity of the illumination light is relatively high.

A basic configuration of the lighting device 20 and the display device 1 of the present embodiment is the same as that of the first embodiment, which is described with reference to FIGS. 1 to 4, and therefore the same reference numerals are given to the same components and the description thereof will be omitted. Also in the present embodiment, in the same manner as in the first embodiment, the correction member 50 is provided between the light transmissive substrate 30 and the light source 40 and the plate-like reflection member 60 (the first reflection member) is provided on the side opposite to the light transmissive substrate 30 with respect to the light source 40 (between the light source 40 and the display member 10).

In the first embodiment, the correction member 50 is the plate member 51. However, in the present embodiment, the correction member 50 is formed of a frame-like member 52 shown in FIG. 16. As shown in FIGS. 14 and 15, the frame-like member 52 (the correction member 50) extends in a frame shape along the outer edge of the light transmissive substrate 30 between the light transmissive substrate 30 and the display member 10. The frame-like member 52 is also used as a so-called decorative frame. The frame-like member 52 has a triangular cross-sectional shape whose bottom side 52a faces the outside of the light transmissive substrate 30 in plan view and whose apex faces the inside. A surface 52b of the frame-like member 52 toward the light source 40 is a tapered surface obliquely inclined by 15° from a posture in parallel with the light transmissive substrate 30. The surface 52b of the frame-like member 52 toward the light source 40 is a molding surface to form the frame-like member 52 by using a black resin and has light reflecting characteristics. The inner circumference of the frame-like member 52 may be chamfered. When the inner circumference is chamfered, the cross-sectional shape of the frame-like member 52 becomes a quadrangle such as a trapezoid. In this case, the frame-like member 52 is arranged so that the lower base of the frame-like member 52 faces the outside of the light transmissive substrate 30 in plan view.

A light beam analysis result in the lighting device 20 having the configuration described above is shown as a result (h) in FIGS. 17 and 18. As known from the result (h) shown in FIGS. 17 and 18, according to the present embodiment, it is possible to improve uniformity of intensity of illumination light at a position close to the light source 40, and the uniformity is about 30%. The utilization efficiency of light is 0.5%.

Modified Example Of Third Embodiment

Figure 19:
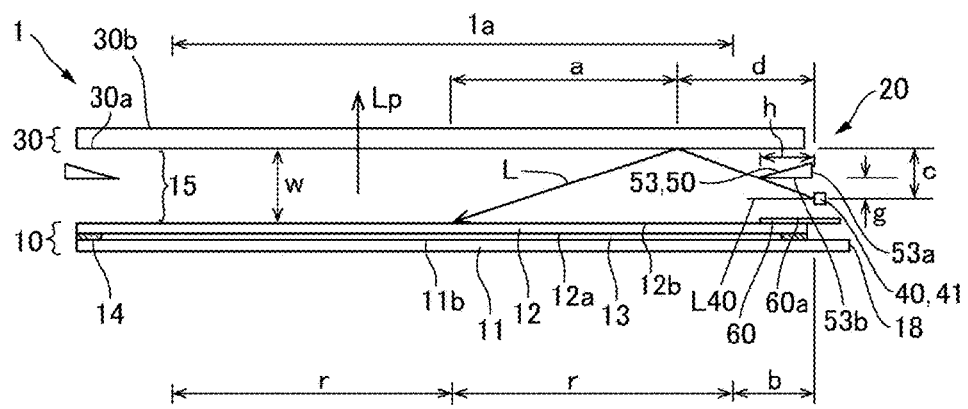
FIG. 19 is a cross-sectional view of a lighting device and a display device according to a modified example of the third embodiment.
Figure 20:
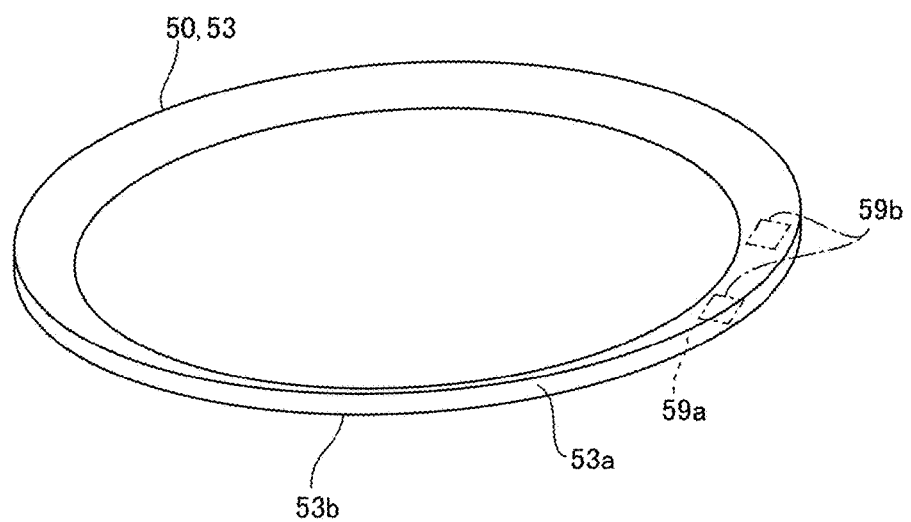
FIG. 20 is a perspective view of a correction member used in the lighting device and the display device shown in FIG. 19.
Figure 21:
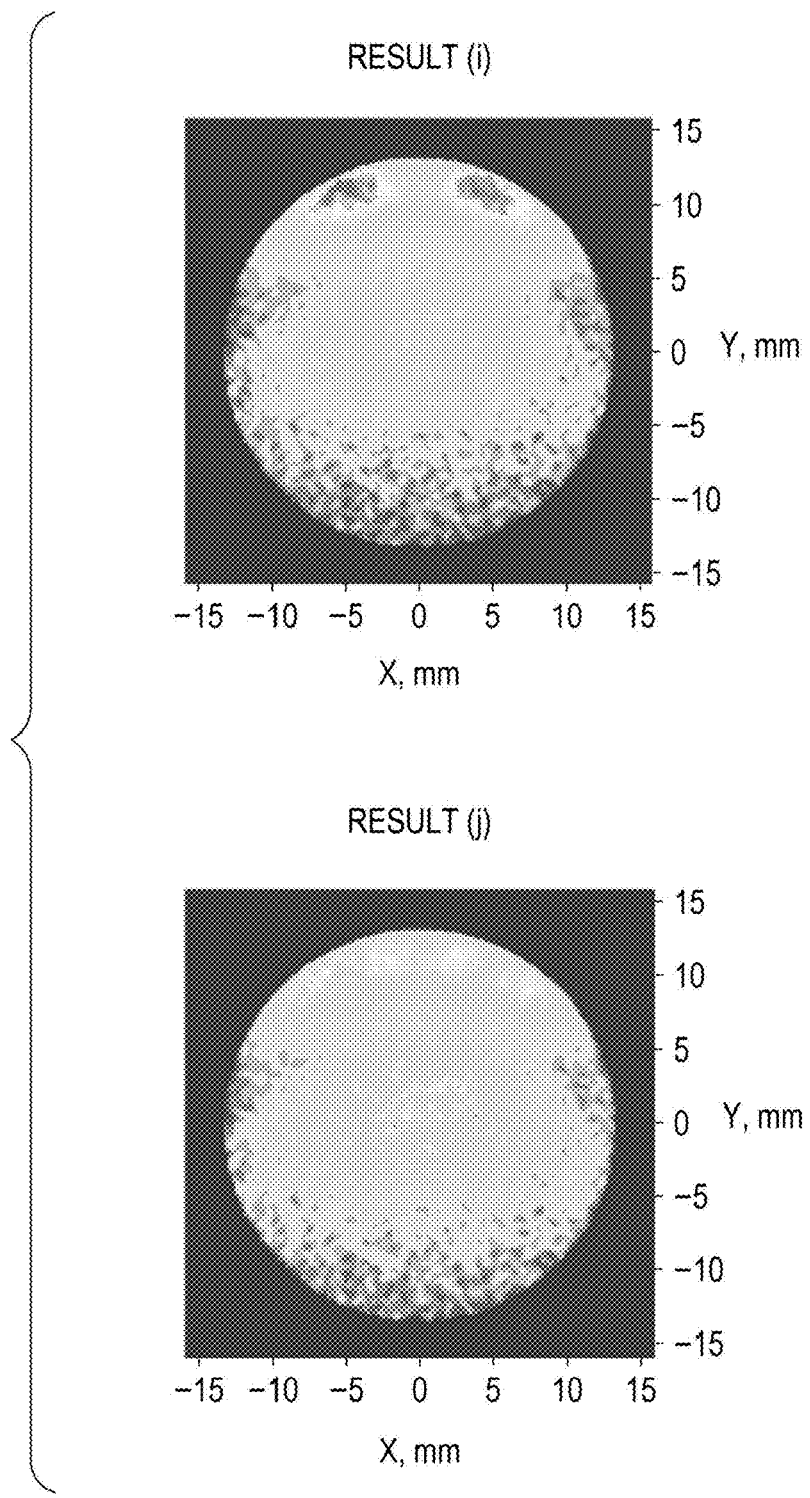
FIG. 21 is an explanatory diagram showing light beam analysis results in the lighting device shown in FIG. 19.
Figure 22:
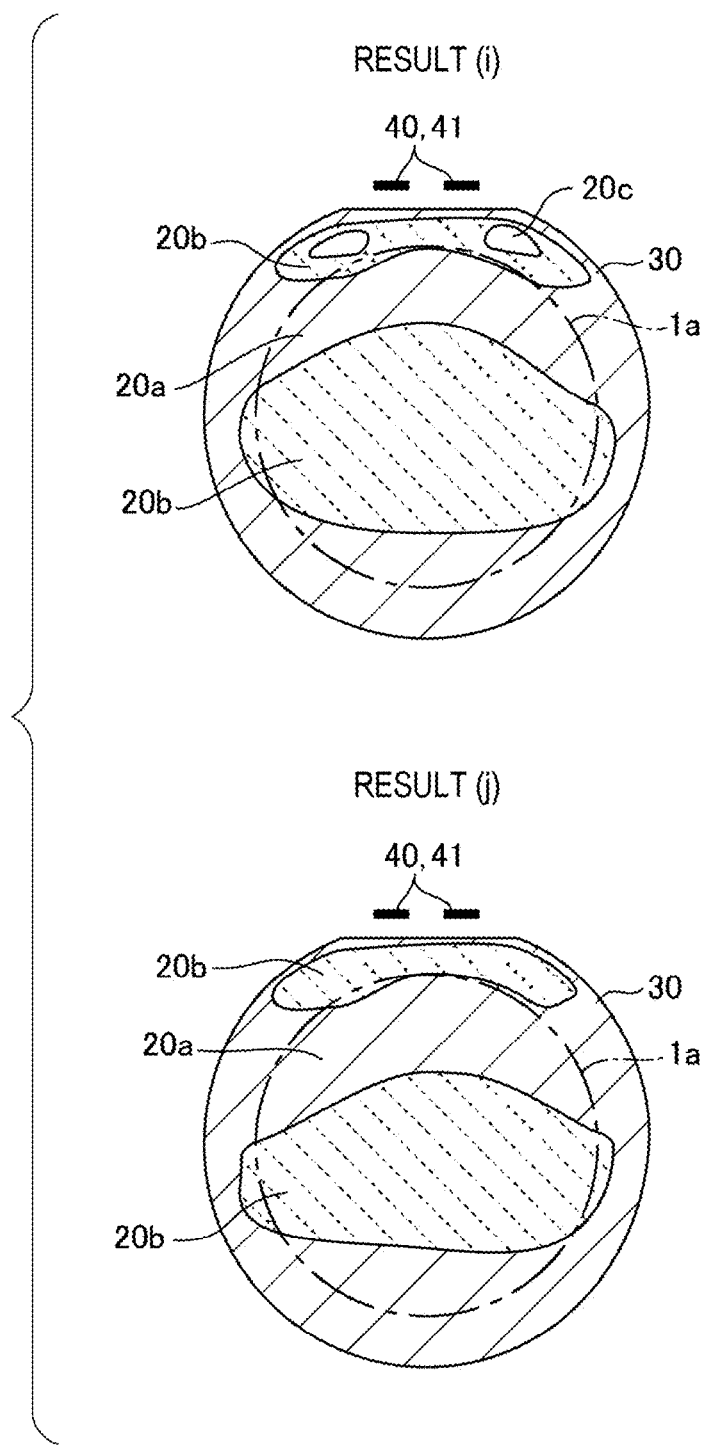
FIG. 22 is an explanatory diagram schematically showing characteristics of the light beam analysis results shown in FIG. 21.

FIG. 19 is a cross-sectional view of a lighting device and a display device according to a modified example of the third embodiment. FIG. 20 is a perspective view of a correction member used in the lighting device and the display device shown in FIG. 19. FIG. 21 is an explanatory diagram showing light beam analysis results in the lighting device 20 shown in FIG. 19. FIG. 22 is an explanatory diagram schematically showing characteristics of the light beam analysis results shown in FIG. 21. In FIG. 22, right-upward oblique lines are drawn in a region 20a where the intensity of the illumination light is relatively low, right-downward dotted lines are drawn in a region 20b where the intensity of the illumination light is relatively high, and oblique lines or the like are not drawn in a region 20c where the intensity of the illumination light is the highest.

As shown in FIG. 19, also in the present embodiment, in the same manner as in the third embodiment, the correction member 50 is provided between the light transmissive substrate 30 and the light source 40 and the plate-shaped reflection member 60 (the first reflection member) is provided on the side opposite to the light transmissive substrate 30 with respect to the light source 40 (between the light source 40 and the display member 10). In the present embodiment, the correction member 50 is formed of a frame-like member 53 shown in FIG. 20 and the frame-like member 53 is arranged so as to extend in a frame shape along the outer edge of the light transmissive substrate 30. The frame-like member 53 has a triangular cross-sectional shape whose bottom side 53a faces the outside.

In the frame-like member 53, a surface 53b facing the light source 40 is in parallel with the light transmissive substrate 30. The surface 53b of the frame-like member 53 facing the light source 40 is a molding surface to form the frame-like member 53 by using a black resin and has light reflecting characteristics.

The surface 53b (reflection surface) of the frame-like member 53 facing the light source 40 may be formed so that the reflection ratio of regions surrounded by a dashed-dotted line is low. In this case, the surface 53b (reflection surface) of the frame-like member 53 facing the light source 40 includes a first region 59a and a second region 59b whose reflection ratio is lower than that of the first region 59a. In the present embodiment, while the first region 59a is a reflective region, the second region 59b is a light absorption region, so that the reflectivity of the second region 59b is lower than that of the first region 59a. Such a configuration can be realized by, for example, forming the second region 59b by attaching a light absorptive sheet or the like to the surface 53a (reflection surface) of the correction member 50 facing the light source 40.

In the present embodiment, in the frame-like member 53, as shown by a dashed-dotted line in FIG. 20, the second region 59b is provided in a region overlapping with the optical axis L40 of the light source 40 in plan view between the light source 40 and the display region 1a. For example, In the present embodiment, there are two light sources 40, so that in the frame-like member 53, a quadrangular second region 59b is provided to each of two regions respectively overlapping with the optical axes L40 of the two light sources 40 in plan view.

A light beam analysis result in a case in which the surface 53b (reflection surface) of the frame-like member 53 facing the light source 40 in the lighting device 20 having the above configuration has a uniform reflection ratio is shown as a result (i) in FIGS. 21 and 20. Further, a light beam analysis result in a case in which the first region 59a and the second region 59b are provided on the surface 53b of the frame-like member 53 facing the light source 40 is shown as a result (j) in FIGS. 21 and 20.

As known from the result (i) shown in FIGS. 21 and 22, according to the present embodiment, there is an advantage that a region close to the light source 40 is appropriately brighter than that in the embodiment described with reference to FIGS. 14 and 15. Further, as known from the result (j) shown in FIGS. 21 and 22, according to the present embodiment, there is an advantage that it is possible to improve uniformity of the illumination in a region close to the light source 40 more than that of the result (i) shown in FIGS. 21 and 22.

Fourth Embodiment

Figure 23:
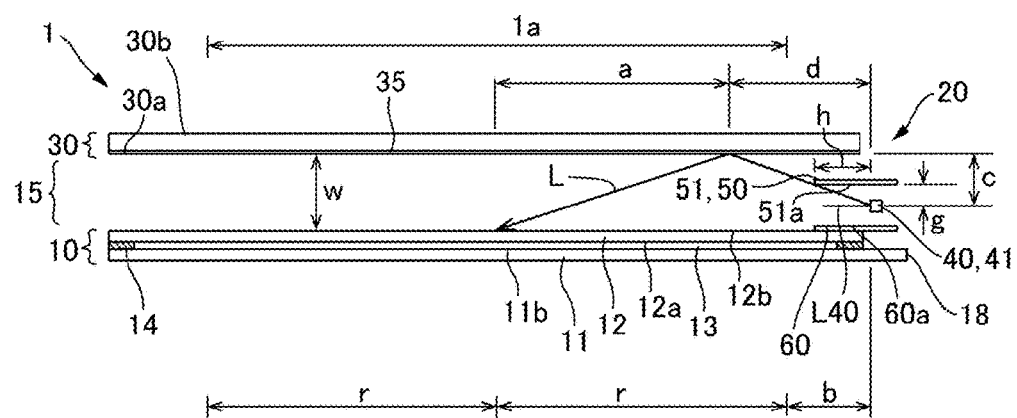
FIG. 23 is a perspective view showing an aspect of a lighting device and a display device according to a fourth embodiment.
Figure 24:
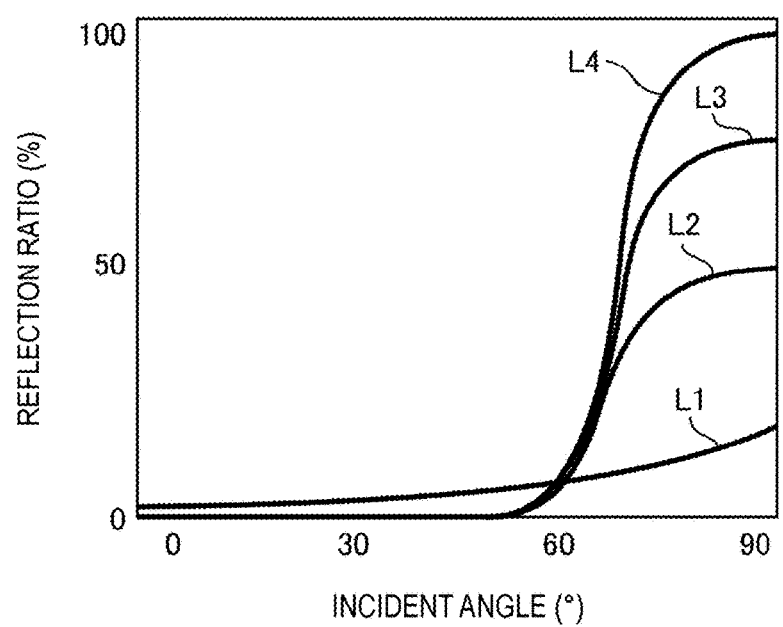
FIG. 24 is an explanatory diagram showing characteristics of a reflective film provided in a light transmissive substrate of the lighting device and the display device shown in FIG. 1.

FIG. 23 is a perspective view showing an aspect of a lighting device and a display device according to a fourth embodiment. FIG. 24 is an explanatory diagram showing characteristics of a reflective film provided in the light transmissive substrate 30 of the lighting device and the display device shown in FIG. 1.

As shown in FIG. 23, a basic configuration of the lighting device 20 and the display device 1 of the present embodiment is the same as that of the first embodiment described with reference to FIGS. 1 to 4. Therefore, the same reference numerals are given to the same components and the description thereof will be omitted. In the present embodiment, a reflective film 35 whose reflection ratio varies according to an incident angle is provided on one surface 30a of the light transmissive substrate 30. As shown by solid lines L1, L2, L3, and L4 in FIG. 24, the reflective film 35 is formed of a dielectric multilayer or the like and can change reflection ratio—incident angle characteristics by the thickness and the refractive index of dielectric films that form the dielectric multilayer.

In the lighting device 20 and the display device 1 configured as described above, when the light source light L emitted from the light source 40 is reflected by the one surface 30a of the light transmissive substrate 30 and enters the display region 1a, the incident angle of the light source light L to the one surface 30a of the light transmissive substrate 30 is 70° or more. Therefore, when the reflection ratio of the one surface 30a of the light transmissive substrate 30 is increased in an incident angle range of 70° to 90°, it is possible to increase the amount of light that enters the display region 1a. Further, it is possible to prevent the light source light L from being directly emitted to the outside, so that it is possible to reduce glare.

For example, in the first embodiment, the utilization efficiency of light is 0.36%. However, when the reflective film 35 whose reflection ratio is 100% at an incident angle of 60° or more (for example, incident angle=85° is used, the utilization efficiency of light is improved to 1.08%. When the reflective film 35 whose reflection ratio is 75% at the incident angle of 60° or more (for example, incident angle=85°) is used, the utilization efficiency of light is 0.76%. When the reflective film 35 whose reflection ratio is 75% at the incident angle of 60° or more (for example, incident angle=85°) is used, the utilization efficiency of light is 0.54%.

However, if the reflection ratio at the incident angle of 70° or more is too much increased, when the light source 40 is turned off, natural light from an oblique direction does not reach the display member 10, so that the display becomes dark. Therefore, the reflective film 35 having appropriate optical characteristics according to a direction of use and the like may be formed. The reflective film 35 may be provided on the other surface 30b opposite to the one surface 30a of the light transmissive substrate 30.

Other Embodiments

In the embodiments described above, a case in which the number of the light sources 40 is two is illustrated. However, the embodiment may be applied to a case in which the number of the light sources 40 is one or three or more.

In the embodiments described above, a case in which the display member 10 and the light transmissive substrate 30 have a circular shape is illustrated. However, the embodiment may be applied to a case in which the display member 10 and the light transmissive substrate 30 have a polygonal shape such as a quadrangle.

In the embodiments described above, a case in which the display member 10 is an electrophoretic panel, a reflection type liquid crystal panel, or the like is illustrated. However, the embodiment may be applied to a case in which the display member 10 is a MEMS display member, an optical interference display member, and a mechanical display member such as analog type clocks and meters.

In the embodiments described above, the reflection member 60 may have a portion overlapping with a region of an outer circumferential portion of the display member 10 different from the display region 1a in plan view. According to this embodiment, it is possible to cause light reflected by the outer circumferential portion of the display device 1 to re-enter the light transmissive substrate 30 and irradiate the display region 1a of the display member 10 with the light as illumination light.

Configuration Example Of Electronic Apparatus

Figure 25:
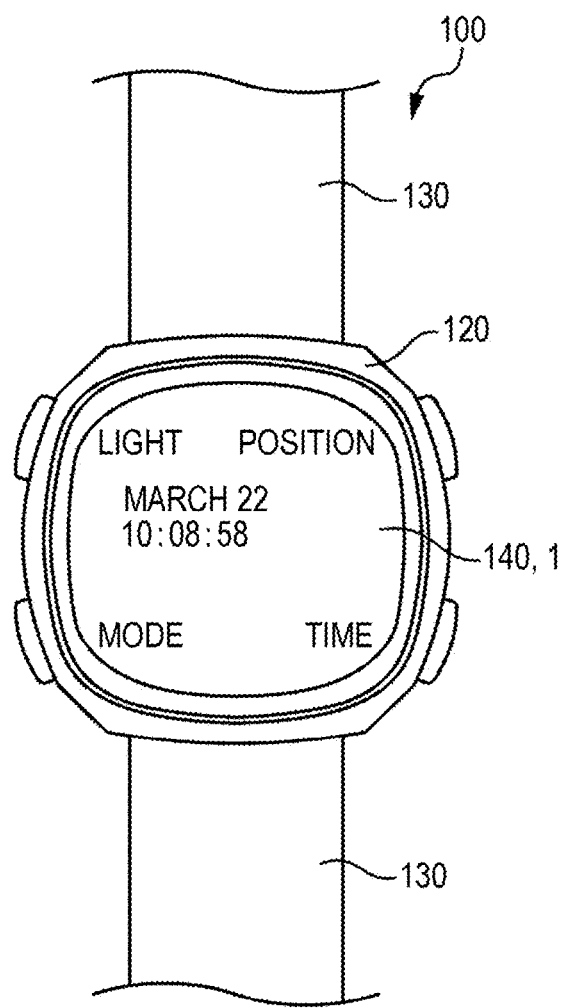
FIG. 25 is an explanatory diagram showing an aspect of a mobile electronic apparatus including a display device 1 to which the embodiment is applied.

FIG. 25 is an explanatory diagram showing an aspect of a mobile electronic apparatus 100 including the display device 1 to which the embodiment is applied. The mobile electronic apparatus 100 shown in FIG. 25 is an arm wearing type electronic apparatus, which includes a main body unit 120 and a band portion 130. The main body unit 120 includes a GPS (Global Positioning System) function that is a kind of satellite positioning system in addition to a clock function. A display unit 140 is formed in the center of the main body unit 120. In the display unit 140, the display device 1 described with reference to FIGS. 1, 2, and so on is used, and the current date and time, the current positional information, and the like are displayed.

The display device 1 to which the embodiment is applied may be used as a display device of a mobile phone, a portable information terminal (PDA: Personal Digital Assistants), a finder of a camera, an electronic paper, and the like in addition to the mobile electronic apparatus 100 shown in FIG. 25.

The entire disclosure of Japanese Patent Application No. 2015-219214, filed Nov. 9, 2015 is expressly incorporated by reference herein.

What is claimed is:

1. A lighting device comprising:
a light transmissive substrate;
a light source provided on one surface side of the light transmissive substrate;
a correction member which is provided between the light transmissive substrate and a first side of the light source and which is provided at a position blocking a part of light proceeding from the light source to the light transmissive substrate; and
a first reflection member which is provided on a second side of the light source opposite to the first side and which reflects a part of light proceeding from the light source toward the light transmissive substrate,
wherein the correction member includes a first portion that overlaps with the light transmissive substrate in a plan view and a second portion that does not overlap with the light transmissive substrate in the plan view.

2. The lighting device according to claim 1, wherein a surface of the correction member facing the light source is a reflection surface.

3. The lighting device according to claim 2, wherein the surface of the correction member facing the light source includes a first region and a second region whose reflection ratio is lower than that of the first region.

4. The lighting device according to claim 1, wherein the correction member is a plate-like member.

5. The lighting device according to claim 1, wherein a second reflection member which is provided along an outer edge of the light transmissive substrate in plan view on the one surface side of the light transmissive substrate and whose inside surface is provided with a reflection surface.

6. The lighting device according to claim 1, wherein the correction member has a frame-like shape along an outer edge of the light transmissive substrate in plan view.

7. The lighting device according to claim 6, wherein the correction member has a triangular cross-sectional shape whose bottom side faces outside of the light transmissive substrate in plan view.

8. The lighting device according to claim 6, wherein the correction member has a trapezoidal cross-sectional shape whose lower base faces outside of the light transmissive substrate in plan view.

9. The lighting device according to claim 7, wherein a surface of the correction member facing the light source is a surface obliquely inclined with respect to the light transmissive substrate.

10. The lighting device according to claim 7, wherein a surface of the correction member facing the light source is a surface in parallel with the light transmissive substrate.

11. The lighting device according to claim 1, wherein a reflective film whose reflection ratio varies according to an incident angle is provided on the one surface of the light transmissive substrate or the other surface which is opposite to the one surface.

12. A display device comprising:
a display member;
a light transmissive substrate arranged to face one surface of the display member;
a light source provided between the display member and the light transmissive substrate;
a correction member which is provided between the light transmissive substrate and the light source and which is provided at a position blocking a part of light proceeding from the light source to the light transmissive substrate; and
a first reflection member which is provided between the display member and the light source and which reflects a part of light proceeding from the light source toward the light transmissive substrate,
wherein the correction member includes a first portion that overlaps with the light transmissive substrate in a plan view and a second portion that does not overlap with the light transmissive substrate in the plan view.

13. The display device according to claim 12, wherein a surface of the correction member facing the light source is a reflection surface.

14. The display device according to claim 12, wherein the display member is an electro-optical device.

15. The lighting device according to claim 1, wherein the first reflection member includes a third portion that overlaps with the light transmissive substrate in the plan view and a fourth portion that does not overlap with the light transmissive substrate in the plan view.

16. The lighting device according to claim 12, wherein the first reflection member includes a third portion that overlaps with the light transmissive substrate in the plan view and a fourth portion that does not overlap with the light transmissive substrate in the plan view.

* * * * *